United States Patent [19]

Engel

[11] 4,016,451

[45] Apr. 5, 1977

[54] HIGH PRESSURE DISCHARGE LAMP DIMMING CIRCUIT UTILIZING VARIABLE DUTY-CYCLE PHOTOCOUPLER

[75] Inventor: Joseph C. Engel, Monroeville, Pa.

[73] Assignee: Westinghouse Electric Corporation, Pittsburgh, Pa.

[22] Filed: Mar. 13, 1975

[21] Appl. No.: 558,109

[52] U.S. Cl. .................... 315/158; 315/DIG. 4; 315/DIG. 5; 315/293
[51] Int. Cl.² ........................................ H05B 37/02
[58] Field of Search ............ 315/DIG. 4, 152, 154, 315/157, 158, 293, DIG. 5; 250/206

[56] References Cited

UNITED STATES PATENTS

| 3,344,310 | 9/1967 | Nuckolls | 315/158 X |
| 3,449,619 | 6/1969 | Stalp | 315/158 X |
| 3,875,458 | 4/1975 | Kappenhagen | 315/DIG. 4 X |

*Primary Examiner*—R. V. Rolinec
*Assistant Examiner*—Lawrence J. Dahl
*Attorney, Agent, or Firm*—W. D. Palmer

[57] ABSTRACT

The low-cost lighting control apparatus for high-pressure discharge lamps utilizing an ON-OFF photocoupler to provide isolation between the relatively high voltage AC supplied to the lamp load and the relatively low voltage DC control circuitry. Preferably, the apparatus is current-feedback stabilized utilizing a feedback resistor.

4 Claims, 3 Drawing Figures

HIGH PRESSURE DISCHARGE LAMP DIMMING CIRCUIT UTILIZING VARIABLE DUTY-CYCLE PHOTOCOUPLER

CROSS-REFERENCE TO RELATED APPLICATIONS

In copending application (Attorney docket No. 45627), filed by J. B. Tabor and owned by the same assignee, is described a high-pressure discharge lamp dimmer for two high-pressure discharge lamps connected in series across a ballasting means which supplies twice the normal ballast output voltage and in which the dimmer is preferably current-feedback stabilized. This series connected lamp combination allows a greater dimming range, as when the voltage is reimpressed after both lamps have been off for some fraction of a half-cycle, the voltage tends to appear primarily across one of the lamps, starting that lamp. The voltage across the lamp which has started quickly drops and the voltage then predominantly appears across the other lamp, starting it as well. This action provides reliable operation at relatively low powder levels (where the lamps are off for a significant portion of each half-cycle). The series for a significant portion of each half-cycle). The series lamp arrangement of this copending application can conveniently be used with the apparatus described herein.

BACKGROUND OF THE INVENTION

This invention relates to lighting systems which control the intensity of illumination such as in stage system or other lighting applications where the ability to electronically adjust the level of illumination is desired. In particular, this invention relates to controlling the intensity of light emitted from high-pressure discharge lamps.

In the past, the light intensity from high-pressure discharge lamps are generally not been adjusted. Incandescent lamp dimmers or fluorescent lamp dimmers (either with voltage feedback or with no feedback circuitry) are not satisfactory for dimming high-pressure discharge lamps. Incandescent lamp dimmers are generally not restricted to a particular fixed load but can instead be used with a varying number of lamps. Because the load current is dependent on the load which is connected, such dimmers cannot control the current and thus current feedback, if any, merely limits the maximum load current, rather than providing a regulating or stabilization function. Further, as stabilizing feedback circuits in regulated incandescent dimmers control the voltage to the load, such dimmers are not appropriate for high-pressure discharge lamps (the intensity from a high-pressure discharge lamp is not proportional to lamp voltage).

An additional problem which arises with high-pressure discharge lamps is that it is somewhat more difficult to design dimmers for more than one or two high-pressure discharge lamps, and thus a large number of dimmers will be required in most applications. Thus, for high-pressure discharge lamps, the cost, size, and weight of the dimmers is especially important.

SUMMARY OF THE INVENTION

The lighting control apparatus of this invention provides a low cost arrangement for varying the light intensity from a high-pressure discharge lamp load. The apparatus utilizes a photocoupler actuated by a variable duty cycle circuit which varies the ON time of a LED in response to an electrical demand signal. The use of a photocoupler eliminates the need for a transformer to provide electrical isolation between the higher voltage AC power and the lower voltage DC demand circuitry. The use of an ON-OFF type operation (rather than a proportional control in which the LED is always ON and the intensity of light from the LED is varied) eliminates the problems caused by the non-linear characteristics of the presently available photocouplers.

Preferably, current feedback is provided by a resistor and the current feedback transformer is also eliminated.

BRIEF DESCRIPTION OF THE DRAWINGS

The invention can be best understood by reference to the following drawings, in which.

DESCRIPTION OF THE PREFERRED EMBODIMENTS

Figure 1:
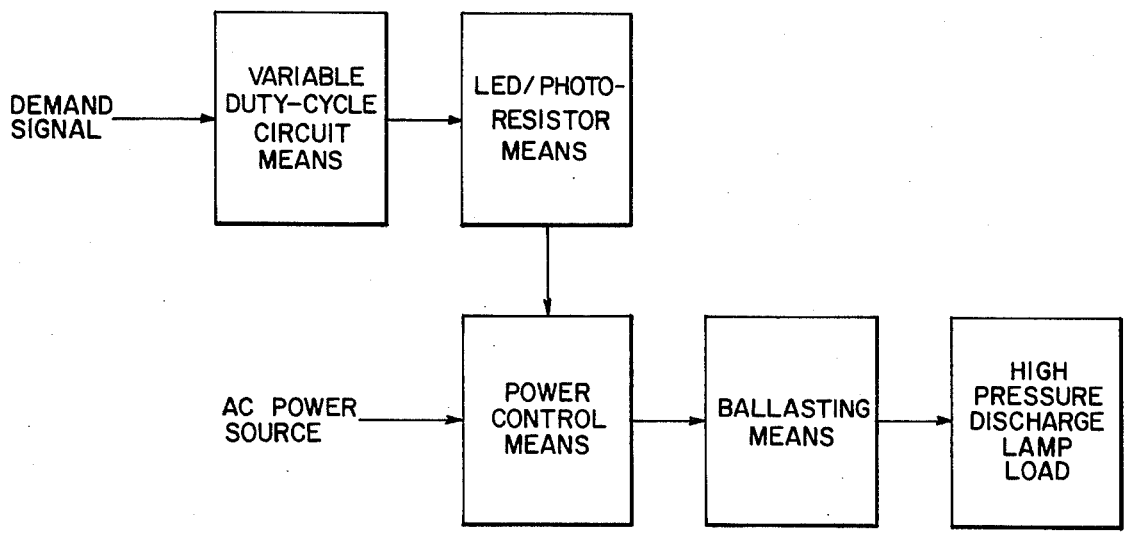
FIG. 1 is a block diagram illustrating the basic relationship of the elements, including the LED/photoresistor.

The block diagram of FIG. 1 shows the basic elements of the lighting control apparatus to provide variable intensity light from a high-pressure discharge lamp load. The power control means has a signal input, a power input and a power output (with the power input being adapted to be connected to a source of AC Power). The ballasting means has an input and an output, and the ballasting means input is connected to the power control means output. The discharge lamp load is connected to the output of the ballasting means. The variable duty cycle circuit means has an input and an output and the variable duty-cycle circuit input is adapted to be connected to a demand signal. The demand signal can be generated, for example, by a potentiometer between DC+ and DC− terminals. The LED-photoresistor means provides electrical isolation between the demand signal and the power control means. The LED-photoresistor means has an input and an output with the LED-photoresistor input being connected to the variable duty-cycle circuit output. The LED-photoresistor output is connected to the signal input of the power control means. The dimmer comprises the power control means, the variable duty-cycle circuit means and the LED/photoresistor means. The dimmer controls the power supplied (from the AC power source) to the ballasting means and thus controls the intensity of the high pressure lamp load.

The high-pressure discharge lamp load can consist of one or more high-pressure discharge lamps, and can consist of two serially-connected high-pressure discharge lamps as taught in the aforementioned copending application. Even with two lamps (instead of one) per dimmer, a large number of dimmers may be required. The elimination of transformers in the dimmers reduces cost and also reduces size and weight. The reduced size and weight makes it practical to install dimmers in the light fixtures.

Figure 2:
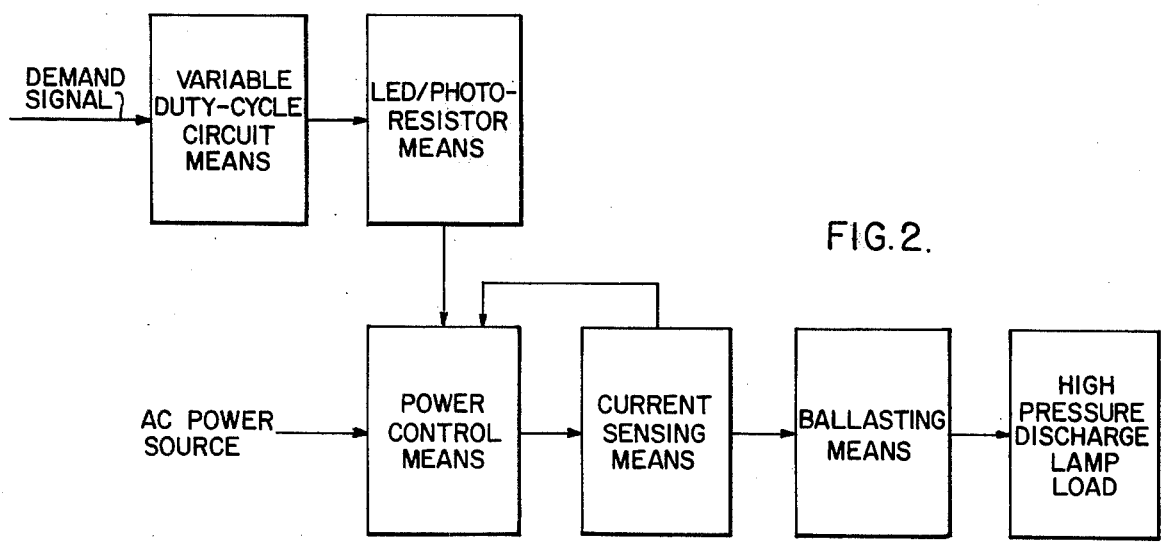
FIG. 2 is a block diagram illustrating the use of a current sensing means.

The block diagram of FIG. 2 shows the use of a current sensing means to provide a regulated dimmer. The current sensing means must be located in series such that it can sense a current proportional to load current, and can be located other than as shown in FIG. 2 (for example, between the AC power source and the power control means). The use of a resistor as the current sensing means avoids the the cost, weight and size problems of current feedback transformers. As a relatively high current (i.e. the ballast primary current) flows through this resistor, its value should be low (preferable less than 1 ohm) to avoid excessive power loss.

Figure 3:
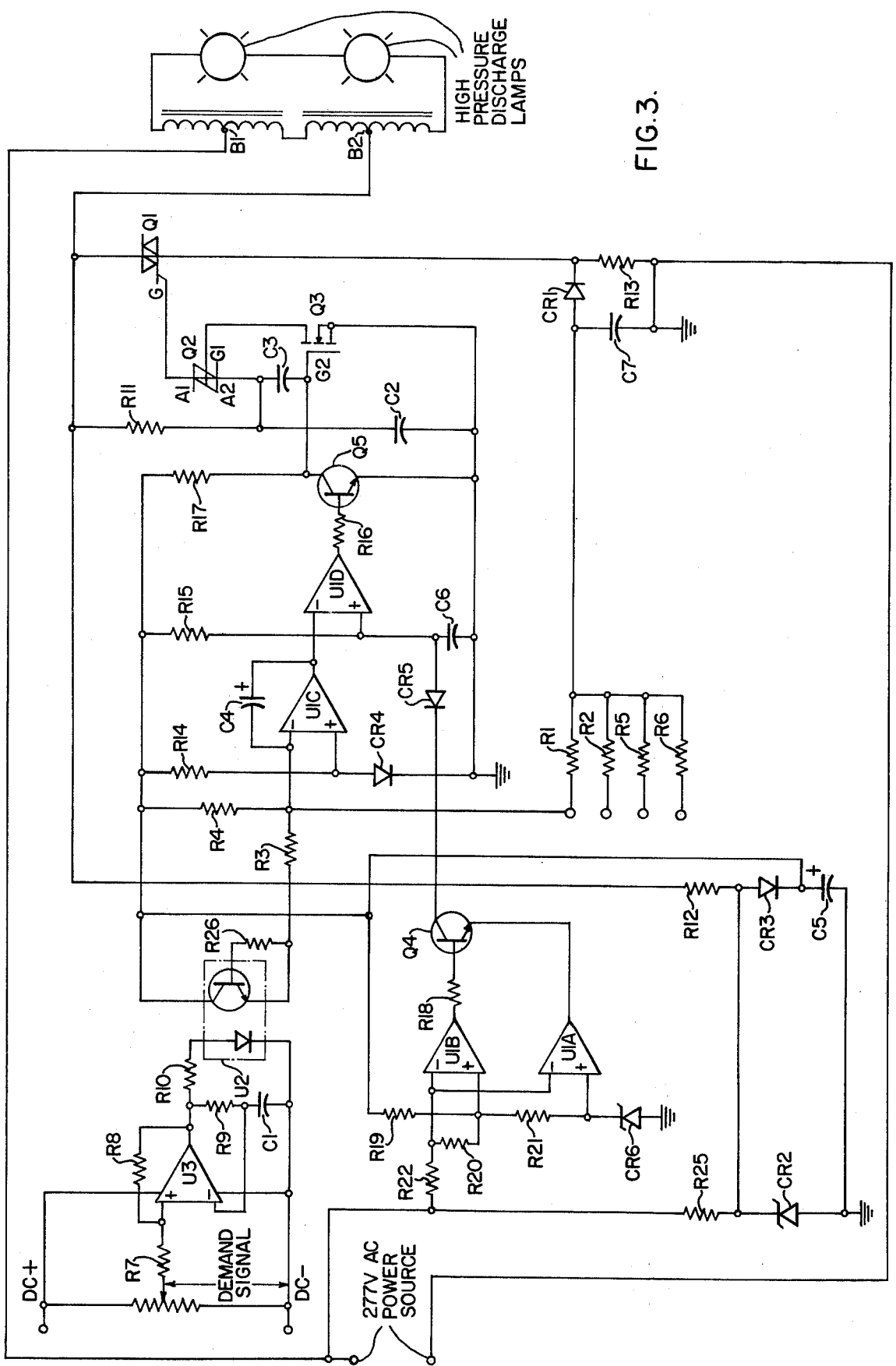
FIG. 3 is a schematic showing a preferred embodiment.

FIG. 3 is a schematic showing a preferred embodiment.

Table 1, below, gives typical values for use in the circuit shown in FIG. 3.

TABLE I

| Reference Identification | Component Value |
| --- | --- |
| R1 | 2.43K, 1/2W, 1% |
| R2 | 650 ohm, 1/2w, 1% |
| R3 | 221K, 1/2W, 1% |
| R4 | 515K, 1/2W, 1% |
| R5 | 1.74K, 1/2W, 1% |
| R6 | 10K, 1/2W, 1% |
| R7, R17 | 100K, 1/2W, 5% |
| R8 | 1M, 1/2W, 5% |
| R9 | 180K, 1/2W, 5% |
| R10 | 3.6K, 1/2W, 5% |
| R11 | 150K, 2W, 5% |
| R12 | 5K, 12W, 5% |
| R13 | 0.1 ohm, 7W, 1% |
| R14 | 650K, 1/2W, 1% |
| R15 | 270K, 1/2W, 5% |
| R16 | 150K, 1/2W, 5% |
| R18 | 47K, 1/2W, 5% |
| R19 | 4.7K, 1/2W, 5% |
| R20 | 20K, 1/2W, 5% |
| R21 | 560 ohm, 1/2W, 5% |
| R22 | 1M, 2W, 5% |
| R25 | 20K, 5W, 1% |
| R26 | 1M, 1/2W, 5% |
| CR1, CR3, CR4, CR5 | IN645A |
| CR2 | IN648B, 20V, 400MW |
| CR6 | IN959B, 8.2V, 400MW |
| C1 | .1uF, 50V |
| C2, C6, C7 | .047uF, 50V |
| C3 | 2200pF 50V |
| C4 | 47uF, 20V |
| C5 | 22uF, 35V |
| Q1 | A01184, ECC Corp. |
| Q2 | MBS 4991, Motorola |
| Q3, Q4, Q5, Q6 | 2N4351 |
| U1 | LM324N, National |
| U2 | MCT-2, Monsanto |
| U3 | 741 Op Amp |

It will be noted that FIG. 3 provides a circuit in which no transformers are used in the dimmer circuit (the ballasts shown are of an autotransformer type but are not considered to be part of the dimmer). The use of resistor R13 as a current sensing means eliminates the need for a current feedback transformer and the use of the LED-photo-resistor pohotocoupler U2 eliminates the need for an isolation transformer. The circuit shown allows dimming of a high-pressure mercury vapor lamp to about 5% of normal light output. In this particular circuit R1, R2, R5, and R6 are selected such that various values of mercury lamps can be operated from the same dimmer apparatus merely by inserting an appropriate jumper. A jumper can be inserted such that R1 and R2 are in parallel for operation of 100-watt lamps, or so that R1 and R5 are in parallel for operation of 175-watt lamps or that R1 and R6 are in parallel for operation of 250-watt lamps or the circuit can be operated without a jumper for operation of 400-watt lamps.

The AC switch Q1 is connected in series with two high reactance autotransformer ballasts B1, B2 across the 277 VAC supply. The circuit compares the actual half-cycle average of the ballast primary current sensed by resistor R13 to a demand signal related to the desired light level. The result of this comparison is used to either advance or retard the turn-on time of Q1 to either increase or decrease the lamp current. The AC switch (triac) could, of course, be replaced with back to back SCR's.

The demand signal is transferred by means of an optical coupler U2 formed by a light emitting diode (LED) and a phototransistor. In this manner, the required isolation between the DC demand circuit and the AC power circuit is achieved without the use of an isolation transformer.

The DC demand signal is introduced into U3 and is converted to an ON-OFF (duty cycle type) signal by the relaxation oscillator circuit formed by operational amplifier U3. The result of this conversion is to make the percentage of the time that the phototransistor U2 is ON proportional to the value of the demand signal. A mid-value of the demand signal results in the transistor portion of U2 being on approximately 50% of the time.

The photocoupler transistor current flows through R3 to the summing node of the error detector amplifier U1C.

The duty cycle oscillator is formed by the combination of time-delayed negative feedback via R9 and C1 and positive feedback via R8 and R7. The output voltage of U3 will, on the average, equal the input demand signal voltage. Because of the hysteresis generated by the positive feedback, however, the output will be a square wave oscillating between DC+ and DC— (supplied from a remote power supply having a voltage in the range of 8–30 volts). The square wave will have an average value equal to the pulse duty cycle multiplied by the power supply voltage.

Operational amplifier U1C forms an integral type error detector which responds to the difference between the reference current (average current through R3 and R4) and the ballast half-cycle average current as sensed by R13. During the negative half-cycle, the current flow through R1 (and any resistor R2, R5, R6 which may be paralleled by a jumper) from the error detector summing node of U1C (the junction of R3 and R4) is proportional to the average ballast current. The drop across CR1 is offset by the drop across CR4. Capacitor C7 is used for noise suppression.

Should the ballast current be too large or too small, the current error present at the R3–R4 junction flows into C4 causing the capacitor voltage to go up or down. When the error is eliminated, the U1C output voltage stabilizes.

A 120 Hz. ramp generator synchronized to line voltage zero crossing is formed by R15, C6 and the reset circuit. The reset circuit is formed by the operational amplifiers U1A and U1B which functions a voltage band detector which turns Q4 on whenever the instantaneous line voltage passes through a particular voltage range. With Q4 ON, capacitor C6 is clamped. When the line voltage passes through C6 is clamped. When the line voltage passes through the particular voltage range, Q4 is turned off and capacitor C6 starts to charge. As explained below, the circuit which produces the AC switch gate trigger pulse, has a time delay of about 200 microseconds during the positive half cycle, but no delay during the negative half cycle and thus the ramp generated during the negative half cycle is designed (by means of the reset circuit) to lag the ramp generated during the positive half cycle by about 200 microseconds. In this way, the trigger pulses occur at the same time following zero voltage (each half cycle) thereby eliminating any "60 Hz. flicker".

In the reset circuit, transistor Q4 is connected in an AND configuration such that if the output of U1B is high and the output of U1A is low (grounded), Q4 is ON. This condition occurs at the beginning and end of each negative half cycle of the power line. R19, R20, R21, and R22 are selected such that the reset time interval is set at the desired 200 microsecond value (which compensates for the 200 microsecnod offset of the gate pulse generator).

In the gate pulse generator, the turn-on gate current pulses for the AC switch Q1 are produced by silicon bidirectional switch Q2, pulse discharge capacitor C2, and charging resistor R11. The bidirection switch Q2 is a three-terminal device with a symmetrical switching voltage of about nine volts. The gate terminal G1 of Q2 provides the ability to inhibit the switching process. When the gate terminal G1 is grounded and transistor Q3 turned ON, the switch Q2 has the characteristic of an eight volt Zener diode between terminals G1 and A2. The voltage across C2 is thus limited to about plus 1 volt in the positive direction and minus 8 volts in the negative direction. The difference in these voltages leads to the 200 microsecond offset of the gate pulse generator. Once these voltages are reached, (each half cycle), excessive charging current through R11 is diverted to ground through Q2 terminals A2 and G1 and through transistor Q3.

During the positive half cycle, the turn-off of Q3 causes C2 to start charging. About 200 microseconds later, when the voltage on C2 reaches 9 volts, the trigger fires. Coupling capacitor C3 (between terminals A2 of Q2 and the gate G2 of Q3) prevents the bidirectional switch Q2 from prematurely turning ON at the instant Q3 is turned OFF. When the gate voltage on G2 of Q3 drops, with Q5 turned ON, charge is transferred from C2 to C3 thereby reducing the voltage across C2. The voltage across the bidirectional switch Q2 is dropped below its conduction level and thus premature turn-on is prevented.

R12 is used to prevent large inductive voltage transients when the AC switch Q1 is turned OFF. R12 also provides a DC power supply current via CR3 (additional current is provided by R25). When Q1 is OFF and supporting 400 volts, for example, the current through R12 is in excess of the maximum holding current of Q1. At the instant Q1 turns ON, this current is switched from R12 to Q1.

The particular circuit described in FIG. 3 illustrates the use of high-pressure mercury vapor lamps, however, the principles illustrated therein can be applied by one skilled in the art to other types of high-pressure discharge lamps such as metal-halide lamps. Appropriate modifications for different types of discharge lamps are known in the art, as some types (high pressure sodium lamps, for example) will normally require starting circuits.

I claim:

1. A lighting control apparatus to provide variable intensity light from a high-pressure discharge lamp load utilizing a photocoupler actuated by a variable duty-cycle circuit which varies the ON time of an LED in response to an externally generated electrical demand signal, said apparatus comprising:
   a. power control means having a signal input, a power input, and a power output, said power input being adapted to be connected to a source of AC power;
   b. ballasting means having an input and an output, said ballasting means input being connected to said power control means output;
   c. a discharge lamp load, said discharge lamp load being connected to the output of said ballasting means;
   d. variable duty-cycle circuit means having an input and an output, said demand signal adapted to be applied to the input of said variable duty-cycle circuit means; and
   e. LED-photoresistor means for providing electrical isolation between said applied demand signal and said power control means, said LED-photoresistor means having an input and an output, said LED-photoresistor means input being connected to said variable duty-cycle circuit means output to cause said LED to be ON a percentage of the time which is proportional to the value of said demand signal, and said LED-photoresistor means output being connected to said signal input of said power control means.

2. The apparatus of claim 1, wherein a current sensing means is connected in series with said power control means for developing a current feedback signal and wherein said power control means has a feedback input and said current feedback signal is connected to said feedback input of said power control means.

3. The apparatus of claim 2, wherein said current sensing means is resistor having an electrical resistance of less than one ohm.

4. A lighting control apparatus to provide variable intensity light from a high-pressure discharge lamp load utilizing a photocoupler actuated by a variable duty-cycle circuit which varies the ON time of an LED in response to an externally generated electrical demand signal, said apparatus comprising:
   a. power control means having a signal input, a power input, and a power output, said power input being adapted to be connected to a source of AC power;
   b. ballasting means having an input and an output, said ballasting means input being connected to said power control means output;
   c. a discharge lamp load, said discharge lamp load being connected to the output of said ballasting means;
   d. variable duty-cycle circuit means having an input and an output, said demand signal adapted to be applied to the input of said variable duty-cycle circuit means;
   e. LED-photoresistor means for providing electrical isolation between said applied demand signal and said power control means, said LED-photoresistor means having an input and an output, and the output of said variable duty-cycle circuit means connected to the input of said LED-photoresistor means to cause said LED to be ON a percentage of the time which is proportional to the value of said demand signal;
   f. current sensing means connected with said power control means for developing a feedback signal; and
   g. an error-detecting circuit having an input connected to the output of said current sensing means and the output of said LED-photoresistor means for receiving the signals therefrom and generating an error output signal which corresponds to the difference between the received signals; and the output of said error-detecting circuit connected to the input of said power control means to control the current through said ballasting means.

* * * * *